United States Patent [19]

Morrill

[11] Patent Number: 5,015,900
[45] Date of Patent: May 14, 1991

[54] MOTOR SUPPORT AND METHOD OF MAKING

[76] Inventor: Giles W. Morrill, 3 Matson Ct., Johnson City, Tenn. 37604

[21] Appl. No.: 396,374

[22] Filed: Aug. 21, 1989

[51] Int. Cl.⁵ .................... H02K 5/00; H02K 15/14; F16M 1/00; F16M 5/00
[52] U.S. Cl. ................................ 310/91; 310/42; 248/672; 248/678
[58] Field of Search .................... 310/42, 89, 91; 248/672, 678; 415/213.1, 223

[56] References Cited

U.S. PATENT DOCUMENTS

| | | |
|---|---|---|
| 1,361,136 | 12/1920 | Burke ........................ 310/91 |
| 2,662,988 | 7/1948 | McKim . |
| 2,731,193 | 5/1951 | Lall et al. . |
| 3,201,857 | 3/1963 | Klonski . |
| 3,506,226 | 6/1968 | Blomgren . |
| 4,076,197 | 2/1978 | Dochterman . |
| 4,323,217 | 4/1982 | Dochterman . |
| 4,520,284 | 5/1985 | Wolcott ........................ 310/42 |
| 4,610,601 | 9/1986 | Gerfast . |
| 4,739,206 | 4/1988 | Sieber . |
| 4,834,615 | 5/1989 | Mauch et al. ........................ 345/213.1 |
| 4,877,984 | 10/1989 | Colwell et al. ........................ 310/91 |

FOREIGN PATENT DOCUMENTS

| | | | |
|---|---|---|---|
| 121199 | 2/1931 | Fed. Rep. of Germany ........ 310/91 |
| 816113 | 10/1951 | Fed. Rep. of Germany ........ 320/91 |
| 1056643 | 3/1954 | France ........................ 248/678 |
| 2316849 | 1/1977 | France ........................ 310/91 |
| 0089542 | 5/1984 | Japan ........................ 310/91 |

Primary Examiner—Steven L. Stephan
Assistant Examiner—C. LaBalle
Attorney, Agent, or Firm—Pearne, Gordon, McCoy & Granger

[57] ABSTRACT

An electric motor mount has a sheet metal L-shaped base of first and second parts. The base first part has a rectangular aperture established by first and second arms lanced from the sheet metal and bent at about a 30-degree angle. The motor is secured to the proximal ends of these arms to have considerable radial rotational flexibility about the motor axis. The base second part has a circular aperture caused by a disc being punched therefrom. A fan blade is made from the circular disc and driven by the motor, which is mounted so that the fan blade is at this circular aperture.

17 Claims, 2 Drawing Sheets

MOTOR SUPPORT AND METHOD OF MAKING

BACKGROUND OF THE INVENTION

In some small fractional horsepower motors, a U-shaped sheet metal base has been used as a motor support with the motor either depending from or supported above the U-shaped base, as in U.S. Pat. No. 2,662,988. U.S. Pat. No. 4,739,206 suggests a motor base which curves around part of the motor and has bent out legs. U.S. Pat. No. 4,323,217 has a belly band around the motor which carries radial arms for mounting.

U.S. Pat. No. 3,506,226 suggests a complicated motor support bracket bent from flat metal stock into three planes to isolate vibrations in the three planes. U.S. Pat. No. 4,076,197 has three generally radial arms welded to the motor for a motor support.

U.S. Pat. No. 2,731,193 suggests a fan blade stamped and formed from flat sheet. U.S. Pat. No. 3,201,857 teaches a fan blade and slinger ring made from a single piece of sheet metal. U.S. Pat. No. 4,610,601 shows a fan blade shaped from flat sheet.

Another motor support was one with a molded plastic base which had a circular aperture surrounding the fan blade on the motor. The motor was supported from the plastic base by three curved arms secured to the motor at equidistantly spaced points along a plane perpendicular to the motor axis at the rear of the motor.

SUMMARY OF THE INVENTION

The problem to be solved, therefore, is how to construct a motor support from a sheetlike base in a simple manner, with the motor being well isolated from the base for rotational vibrations around the motor axis.

This problem is solved by an electric motor and support combination comprising a sheet metal base, first and second arm means unitary with and bent from the plane of said base at the distal end of each arm means, the proximal ends of said two arm means being securement ends, means securing the securement ends of each of the two arm means to said electric motor at points near the periphery thereof so that said first and second arm means are disposed with a radial component relative to said motor, said motor having a shaft axis substantially parallel to said base, and means to drive a load from said motor shaft, whereby said sheet metal base establishes support of said electric motor by said first and second arm means which are disposed with a radial component relative to said motor to establish a relatively large rotational flexibility to said motor.

The problem is further solved by an electric motor support comprising a sheet-type base having first and second unitary, generally planar parts disposed at about a 90-degree angle to each other, first and second arm means unitary with and bent from the plane of said base first part at the distal end of each arm means, means for securing the proximal ends of each of the two arm means to an electric motor at points near the periphery thereof so that said first and second arm means are disposed with a radial component relative to the motor, said motor having a shaft with an axis substantially perpendicular to said base second part, a circular aperture in said base second part, a fan on said shaft, and said unitary base being adapted to support an electric motor by said first and second arm means which are disposed with a radial component relative to the motor to establish a relatively large rotational flexibility to the motor with the motor fan disposed at said circular aperture.

The problem is still further solved by a method of constructing a motor support comprising the steps of forming a sheet metal base, lancing first and second arms from a generally rectangular aperture in said sheet metal base, bending the distal end of each of said first and second arms relative to said base to have the proximal ends of the two arms separated, forming securement means at the proximal ends of the two arms for securing to a motor near the periphery thereof so that the first and second arms are disposed with a radial component relative to the motor, whereby with a motor attached to said proximal ends of the two arms the radial component relative to the motor establishes a relatively large rotational flexibility to the motor.

An object of the invention is to provide a sheet metal motor support which may readily be formed from a single piece of sheet metal and yet which provides good vibration isolation for the motor.

Other objects and a fuller understanding of the invention may be had by referring to the following description and claims, taken in conjunction with the accompanying drawing.

DESCRIPTION OF THE PREFERRED EMBODIMENT

Figure 1:
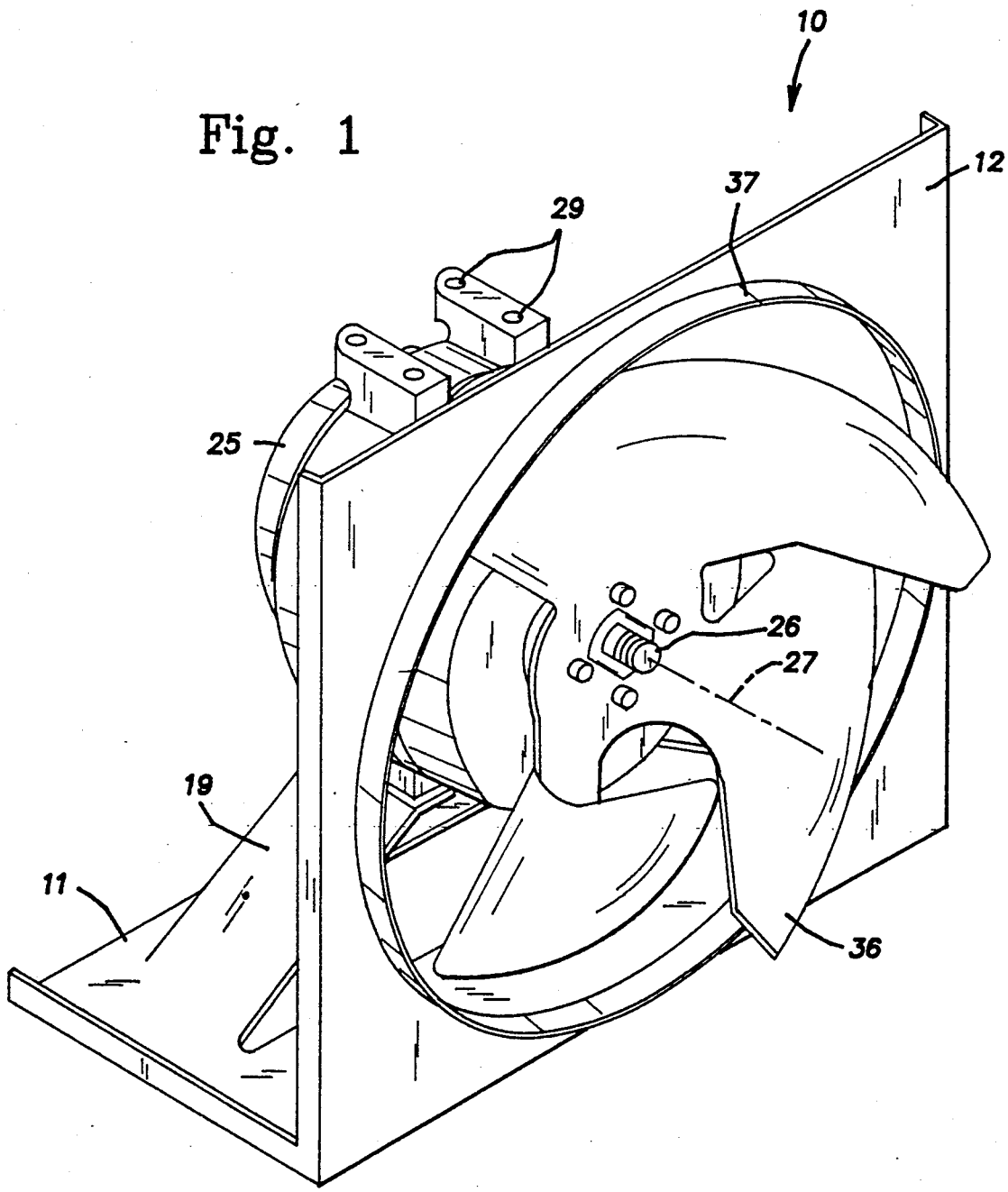
FIG. 1 is an isometric view from the front, showing my new motor support, with a motor and fan blade.
Figure 2:
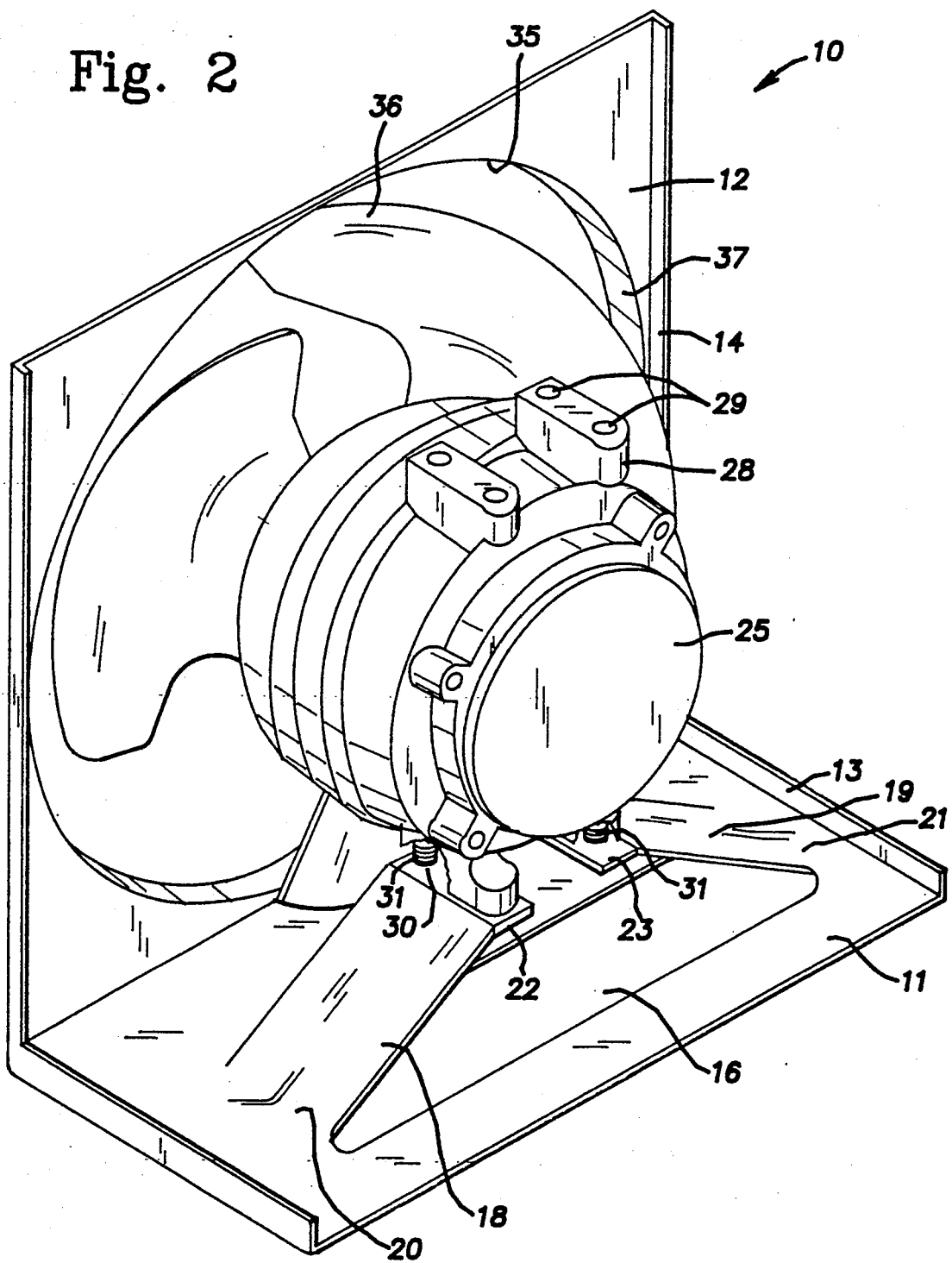
FIG. 2 is a rear isometric view thereof.

FIGS. 1 and 2 show a sheetlike base 10, preferably of sheet metal, and having a base first part 11 and a base second part 12. These two parts of the base are unitary with each other, namely, the first and second parts may be bent from a single piece of sheet metal. The base first part 11 has stiffening flanges 13 and the base second part has stiffening flanges 14 to help maintain each part in a planar condition.

An elongated, rectangular first aperture 16 is formed in the base first part 11 by lancing from the metal of the base first part 11 first and second arm means 18 and 19, respectively. The arm means are lanced so that the distal ends 20 and 21, respectively, are bent from the ends of the aperture 16 at about a 30-degree angle. The proximal ends 22 and 23 of the first and second arm means 18 and 19, respectively, are bent in the opposite direction at about a 30-degree angle so that they are parallel to the base first part 11. These proximal ends may be unitary with each other if the metal is stretched, or if the metal of the base first part is contracted by folds, for example, although in the preferred embodiment, the proximal ends are separated.

The figures show a subfractional horsepower electric motor 25 mounted on these first and second arm means. The motor has a rotational shaft 26 with a shaft axis 27. The motor frame has mounting feet 28 each with two mounting apertures 29. The proximal ends 22 and 23 of the arm means each have two corresponding securement apertures 30 adapted to receive securing means such as machine screws 31. The head of each machine screw may lie against the bottom of the proximal ends 22 or 23 and pass through the securement apertures and into the mounting apertures to secure the motor 25 in position. By this means, the first and second arm means are disposed with a radial component relative to the motor to establish a relatively large rotational flexibility to the motor compared with the flexibility of the base 10.

The base second part 12 has a circular aperture 35 generally coaxial with the shaft axis 27. This may be a disc removed from the base second part, for example, by punching. From this circular disc a fan blade 36 is formed and this fan blade is an example of a load which is secured to the shaft 26 to be rotated by the motor 25. Preferably, the peripheral edge of the circular aperture 35 is bent into the form of a stubby cylinder to form a shroud 37. The mounting of the motor 25 places the fan blade 36 generally at the circular aperture and shroud 37 to enhance the volumetric efficiency of the fan blade 36.

The utilization of the disc punched out to form the circular aperture 35 to make the fan blade 36, and the use of the arms 18 and 19 lanced from the rectangular aperture 16 to form a vibration isolating mount for the motor make this motor mount one which is simple to construct and economical of material and labor. The two arms 18 and 19 take substantially all of the material lanced from the base to form the rectangular aperture 16, and in the preferred embodiment all of the material is so used. These arms extend at about a 30-degree angle to the base first part 11, and thus have a considerable radial component relative to the motor axis, so that any torque pulsations or vibrations are readily absorbed by the rather elastic arms 18 and 19, and only a minimum is transmitted to the base 10. This provides a quiet running motor and fan combination. The width of the arms 18 in a direction parallel to the shaft axis is sufficient to provide stability of the motor 25 secured to the arms. In particular, the spacing between the mounting apertures 29 and corresponding securement apertures 30 is in a direction parallel to the shaft axis, and this spacing is sufficient in stiffness to hold the motor stable. Also, a plane through the center of gravity perpendicular to the shaft axis passes through both arms 18 and 19, so that there is little tendency for droop of either end of the motor, and hence this also contributes to the stability of the motor mount. By this means, the shaft axis is maintained substantially coaxial with the circular aperture 35, yet the arms are able to absorb most of the rotational vibrations of the motor. The arms 18 and 19 may be curved, although in the preferred embodiment they are shown as straight, each lying essentially in a plane.

The present disclosure includes that contained in the appended claims, as well as that of the foregoing description. Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. An electric motor and support combination comprising:
   a base formed of sheet metal and having a major portion lying in a base plane;
   first and second arm means unitary with and bent from the plane of said base;
   each of said two arm means having a distal end at the plane of the base and a proximal end adjacent said motor;
   the proximal ends of said two arm means being securement ends;
   means securing the securement ends of each of the two arm means to said electric motor at points near the periphery thereof so that said first and second arm means are disposed with a substantial radial component relative to said motor;
   said motor having a shaft axis substantially parallel to said base; and
   means to drive a load from said motor shaft, said sheet metal base establishing support of said electric motor and said load by said first and second arm means which are disposed with a substantial radial component relative to said motor to establish a relatively large rotational flexibility to said motor by flexure of said two arm means;
   said base being substantially free of contact or connection with the motor other than through said two arm means whereby the support of said motor and load is substantially exclusively through said two arm means.

2. A motor and support combination as set forth in claim 1, wherein said two arm means are separated at said securement ends.

3. A motor and support combination as set forth in claim 1, wherein the distal end of each of said arm means is bent from the plane of said base at about a 30-degree angle.

4. A motor and support combination as set forth in claim 1, wherein said two arm means are bent from opposite ends of a substantially rectangular aperture in said base and constituting substantially all of the sheet metal of said rectangular aperture.

5. A motor and support combination as set forth in claim 1, wherein said arm means are first and second separate arms lanced from the metal of said base.

6. A motor and support combination as set forth in claim 1, wherein the load is a fan blade fastened to said shaft.

7. A motor and support combination as set forth in claim 4, wherein said two arm means have an appreciable width parallel to said shaft axis for stability of the motor secured to said arm means.

8. A motor and support combination as set forth in claim 4, wherein said securement means includes two securement points on each securement end disposed in a line substantially parallel to said shaft axis for stability of the motor secured to said arm means.

9. An electric motor support comprising:
   a sheet-type base having first and second unitary, generally planar parts disposed at about a 90-degree angle to each other;
   first and second arm means unitary with and bent from the plane of said base;
   each of said two arm means having a distal end at the plane of the base and a proximal end adjacent said motor;
   means for securing the proximal ends of each of the two arm means to an electric motor at points near the periphery thereof so that said first and second arm means are disposed with a substantial radial component relative to the motor;
   said motor having a shaft with an axis substantially perpendicular to said base second part;
   a circular aperture in said base second part;
   a fan on said shaft; and
   said unitary base being adapted to support the electric motor by said first and second arm means which are disposed with a substantial radial component relative to the motor to establish a relatively large rotational flexibility to the motor with the motor fan disposed at said circular aperture;

said base being substantially free of contact or connection with the motor other than through said two arm means whereby the support of said motor and fan is substantially exclusively through said two arm means.

10. An electric motor support as set forth in claim 9, wherein said base is of sheet metal.

11. An electric motor support as set forth in claim 9, wherein said proximal ends of said arm means are separate to form first and second arms; and said first and second arms are lanced from a first aperture on said base first part.

12. An electric motor support as set forth in claim 9, wherein the width of said arm means is sufficient to establish stability of said fan at said circular aperture.

13. An electric motor support as set forth in claim 9, wherein said arm means have a width sufficient to establish said securement means with two securement points in a line substantially parallel to said shaft axis to provide stability to said fan at said circular aperture.

14. An electric motor support as set forth in claim 10, including a fan shroud formed from metal surrounding said circular aperture in said base second part.

15. An electric motor support as set forth in claim 10, including said fan being formed from the sheet metal removed to form said circular aperture.

16. An electric motor support as set forth in claim 11, wherein said first aperture is an elongated rectangular aperture with said first and second arm distal ends extending from the ends of said first aperture.

17. An electric motor support as set forth in claim 11, wherein said first and second arms are substantially straight and are bent at about a 30-degree angle at said distal ends thereof.

* * * * *